Patented July 24, 1928.

1,678,418

UNITED STATES PATENT OFFICE.

ALEXANDER CARR BENNETT, OF FAIRFIELD, NEW SOUTH WALES, AUSTRALIA.

PROCESS FOR TREATING SEEDS TO AUGMENT THEIR CULTURAL VALUE.

No Drawing. Application filed December 15, 1926, Serial No. 155,115, and in Australia March 26, 1926.

This invention consists in a process for augmenting the cultural value of agricultural and horticultural seeds.

The seeds are first steamed or soaked in warm water or cold water to soften the cuticle. The time required for this first step varies according to the size, nature, and condition of the seed, small soft seed requiring a minimum time and large hard seed a maximum time, the range varying from 5 minutes or less to 15 minutes, or more. It is necessary that the dampening of the seed shall extend to the germ or eye but not necessarily into the centre of the core substance.

The seed is then drained to remove superfluous water, and spread in a compact layer on a sheet of zinc or other conductive metal which is earthed. The layer should be a single layer so that each seed touches the plate; when the layer is two or more seeds in depth the treatment is less productive of satisfactory results.

The seeds are now subjected to the influence of a high frequency electrical discharge for a period of 5 to 15 minutes more or less, large seeds requiring a longer treatment than small ones. Alternating electric current is stepped up to high frequency in a Tesla coil or equivalent apparatus; the terminal of the high frequency apparatus is connected to the terminal of a highly evacuated vacuum tube of cylindrical shape. The discharge produces a red violet glow in the tube. The glowing tube is rolled over the layer of seeds to and fro during the period of treatment, a bail handpiece of vulcanite or like non-conducting material being fitted to it to facilitate manipulation.

Finally the treated seeds are air-dried to restore them to normal condition.

The cultural value of seeds of all kinds is substantially improved by this treatment, their vitality and germination capacity being exalted.

What I claim as my invention and desire to secure by Letters Patent is:—

A process of augmenting the cultural value of agricultural seeds, which consists in soaking them in water, spreading them while damp in a layer upon an earthed plate and rolling over them for a period of 5 to 15 minutes more or less, a vacuum tube which is connected to a source of high frequency electrical current, substantially as described.

In testimony whereof I affix my signature.

ALEXANDER CARR BENNETT.